(12) United States Patent  
Damazio-Coelho et al.

(10) Patent No.: US 9,025,351 B2
(45) Date of Patent: May 5, 2015

(54) CONVERTER CIRCUIT FOR DAMPING OVERCURRENT OSCILLATIONS

(71) Applicant: ABB Technology AG, Zürich (CH)

(72) Inventors: Kefas Damazio-Coelho, Nussbaumen (CH); Matthias Luescher, Gontenschwil (CH); Oscar Apeldoorn, Lengnau (CH); Thomas Berner, Waldshut-Tiengen (DE)

(73) Assignee: ABB Technology AG, Zurich (CH)

( * ) Notice: Subject to any disclaimer, the term of this patent is extended or adjusted under 35 U.S.C. 154(b) by 123 days.

(21) Appl. No.: 13/857,574

(22) Filed: Apr. 5, 2013

(65) Prior Publication Data

US 2013/0223112 A1    Aug. 29, 2013

Related U.S. Application Data

(63) Continuation of application No. PCT/EP2011/066630, filed on Sep. 26, 2011.

(30) Foreign Application Priority Data

Oct. 5, 2010   (EP) .................................... 10186492

(51) Int. Cl.
*H02M 7/48* (2006.01)
*H02M 1/34* (2007.01)
*H02M 7/06* (2006.01)

(52) U.S. Cl.
CPC ....... *H02M 1/34* (2013.01); *H02M 7/06* (2013.01); *H02M 7/48* (2013.01); *H02M 2001/346* (2013.01); *Y02B 70/1491* (2013.01)

(58) Field of Classification Search
USPC .......... 307/100; 323/223–226, 229–231, 233, 323/905, 908; 361/111; 363/16, 17, 56.12
See application file for complete search history.

(56) References Cited

U.S. PATENT DOCUMENTS 4,005,350 A * 1/1977 Brenneisen ...................... 363/58
4,058,696 A * 11/1977 Antier et al. .................. 219/668

(Continued)

FOREIGN PATENT DOCUMENTS

EP    0 776 083 A2    5/1997
EP    1 619 785 A2    1/2006

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Apr. 18, 2013, in the corresponding International Application No. PCT/EP2011/066630. (6 pages).

(Continued)

*Primary Examiner* — Adolf Berhane
*Assistant Examiner* — Gary Nash
(74) *Attorney, Agent, or Firm* — Buchanan Ingersoll & Rooney PC

(57) ABSTRACT

An exemplary converter circuit has a converter unit with plural actuatable power semiconductor switches, and the DC voltage side of which is connected to a capacitive energy storage circuit. The capacitive energy storage circuit has at least one capacitive energy store and at least one snubber network for limiting the rate of current or voltage rise on the actuatable power semiconductor switches of the converter unit. In order to reduce undesirable oscillations in an overcurrent in the capacitive energy storage circuit, the capacitive energy storage circuit has at least one passive nonactuatable damping unit having a unidirectional current-flow direction, where the passive nonactuatable damping unit has a diode and a damping resistor.

13 Claims, 4 Drawing Sheets

(56) References Cited

U.S. PATENT DOCUMENTS

| | | | |
|---|---|---|---|
| 5,768,114 A * | 6/1998 | Gruning et al. | 363/58 |
| 6,452,815 B1 | 9/2002 | Zhu et al. | |
| 2003/0002304 A1 | 1/2003 | Zhu et al. | |
| 2009/0267576 A1 * | 10/2009 | Orr | 323/259 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 18, 2013, in the corresponding International Application No. PCT/EP2011/066630. (6 pages).

International Search Report (PCT/ISA/210) issued on May 2, 2012, by the European Patent Office as the International Searching Authority for International Application No. PCT/EP2011/066630.

Written Opinion (PCT/ISA/237) issued on May 2, 2012, by the European Patent Office as the International Searching Authority for International Application No. PCT/EP2011/066630.

Search Report issued on Apr. 27, 2011, by the European Patent Office for Application No. 10186492.4.

Dos Santos et al., "Short circuit and overcurrent protection of IGCT-based three level NPC inverters", Power Electronics Specialists Conference, IEEE, Jun. 2004, pp. 3553-3558.

Yuan et al., "Snubberless Switching-off Characteristics of IGCTs Equipped in High Power Three-level Neutral Point Clamped Converters", Electrical Machines and Systems, IEEE, Sep. 2005, pp. 1257-1260.

Zuckerberger et al., "Design, simulation and realization of high power NPC converters equipped with IGCTs", Industry Applications Conference, IEEE, Oct. 1998, pp. 865-872.

\* cited by examiner

CONVERTER CIRCUIT FOR DAMPING OVERCURRENT OSCILLATIONS

RELATED APPLICATION(S)

This application is a continuation under 35 U.S.C. §120 of International Application PCT/EP2011/066630 filed Sep. 26, 2011 designating the U.S., and claiming priority to European Application EP 10186492.4 filed in Europe on Oct. 5, 2010. The content of each prior application is hereby incorporated by reference in its entirety.

FIELD

The disclosure relates to the field of power electronics, in particular converter circuits.

BACKGROUND INFORMATION

Known converter circuits are used in a large number of applications today. FIG. 1 shows a known converter circuit having a capacitive energy storage circuit 2 which has at least one capacitive energy store. Furthermore, the converter circuit has a converter unit 1, the DC voltage side of which is connected to the capacitive energy storage circuit 2. By way of example, such a converter unit is used for supplying power to an electrical load which can call for an AC voltage, for example. The converter unit 1 itself can have a multiplicity of actuatable power semiconductor switches which are connected up to form known circuits, such as half-bridge or full-bridge circuits.

Furthermore, the capacitive energy storage circuit 2 additionally can include at least one snubber network 3 (known as a snubber circuit) in order to keep down spurious high-frequency or voltage peaks on the actuatable power semiconductor switches of the converter unit 1, which can arise when the actuatable power semiconductor switches switch. Accordingly, such a snubber network 3 prompts limiting of the rate of current or voltage rise on the actuatable power semiconductor switches of the converter unit 1, such as thyristors, IGBTs, IGCTs and the like. As shown in FIG. 1, the snubber network can include a resistor, an inductance, a capacitance and a diode, being connected in the manner as shown in FIG. 1.

If an overcurrent (iF) occurs, as a result of an error in the converter unit 1, the at least one capacitive energy store and the capacitance of the snubber network 3 together with the inductance of the snubber network 3 are thus a resonant circuit which results in the overcurrent iF oscillating with a large amplitude and subsiding only slowly. Such an oscillation is shown by way of example in FIG. 2 in the waveform of the overcurrent iF. This type of oscillation in the overcurrent iF can damage or even destroy the actuatable power semiconductor switches of the converter unit 1, however, and is accordingly highly undesirable.

EP 1 619 785 A2 specifies a converter circuit of the type in question which has a snubber network with a resistor, an inductance, a capacitance and with a diode. There is no provision for a device for damping the aforementioned oscillation in an overcurrent that occurs.

SUMMARY

An exemplary converter circuit is disclosed comprising: a converter unit, having a plurality of actuatable power semiconductor switches, and a DC voltage side connected to a capacitive energy storage circuit, wherein the capacitive energy storage circuit has at least one capacitive energy store and at least one snubber network for limiting a rate of current or voltage rise on the actuatable power semiconductor switches of the converter unit, the capacitive energy storage circuit including at least one passive nonactuatable damping unit having a unidirectional current-flow direction, wherein the passive nonactuatable damping unit has a diode and a damping resistor; and the snubber network including a resistor, an inductance, a capacitance and a diode, wherein the resistor of the snubber network and the diode of the snubber network are connected in series, the series circuit having the resistor of the snubber network and the diode of the snubber network connected in parallel with the inductance of the snubber network, and the capacitance of the snubber network is connected to a connecting point between the resistor of the snubber network and the diode of the snubber network.

An exemplary converter circuit is disclosed comprising: a converter unit, having a plurality of actuatable power semiconductor switches, and a DC voltage side connected to a capacitive energy storage circuit, wherein the capacitive energy storage circuit has at least one capacitive energy store and at least one snubber network for limiting a rate of current or voltage rise on the actuatable power semiconductor switches of the converter unit, the snubber network including a resistor, an inductance, a capacitance and a diode, wherein the resistor of the snubber network and the diode of the snubber network are connected in series, the series circuit having the resistor of the snubber network and the diode of the snubber network connected in parallel with the inductance of the snubber network, and the capacitance of the snubber network is connected to a connecting point between the resistor of the snubber network and the diode of the snubber network.

BRIEF DESCRIPTION OF THE DRAWINGS

These and further objects, advantages and features of the present disclosure become evident from the detailed description of the exemplary embodiments of the disclosure which follows in conjunction with the drawing.

DETAILED DESCRIPTION

Figure 1:
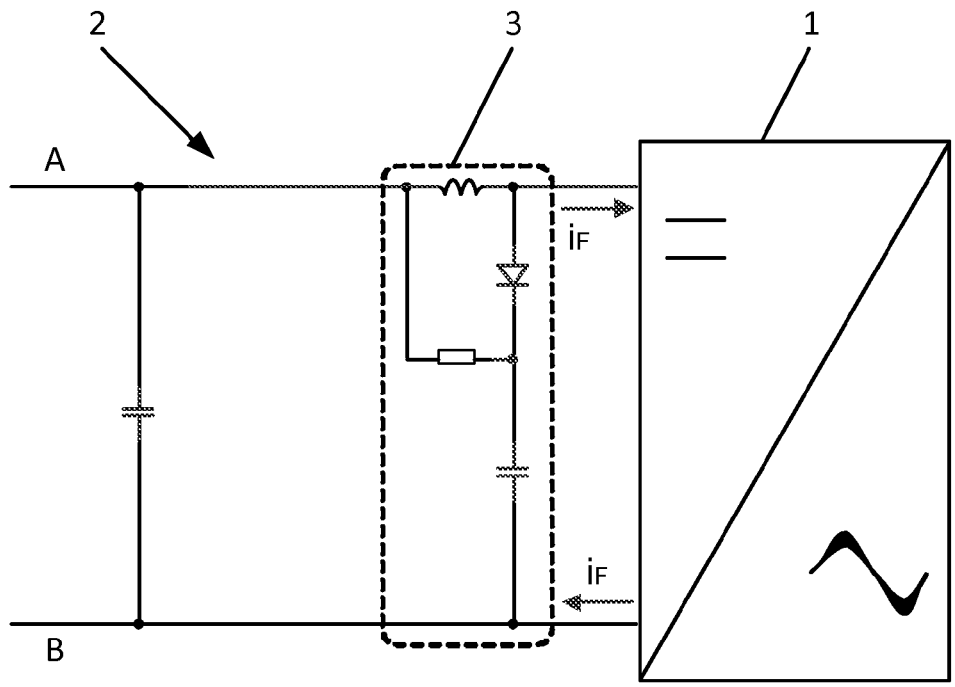
FIG. 1 shows an exemplary embodiment of the disclosure of a converter circuit based on a known implementation.
Figure 2:
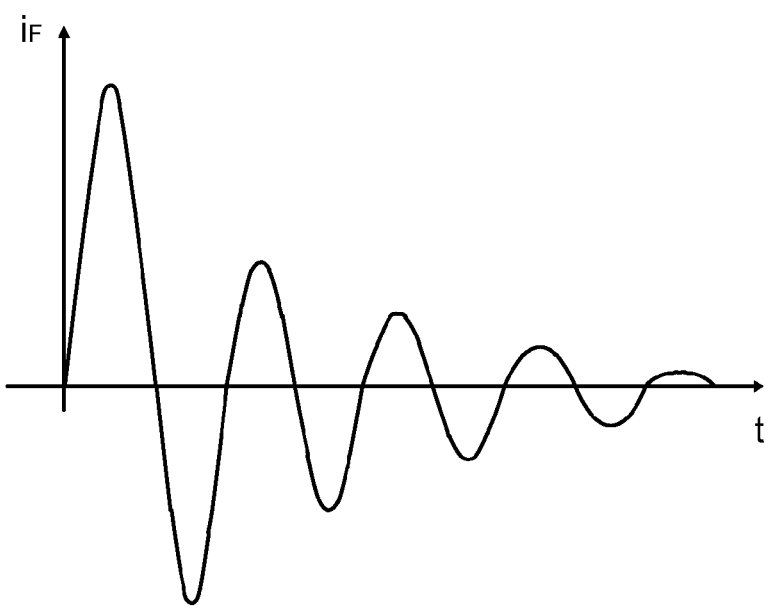
FIG. 2 shows a waveform for an overcurrent in the capacitive energy storage circuit of the known converter circuit shown in FIG. 1.

Exemplary embodiments of the present disclosure specify a converter circuit in which, in the event of an overcurrent occurring in the capacitive energy storage circuit, oscillations in the overcurrent can be avoided to the greatest extent.

An exemplary converter circuit includes a converter unit which has a plurality (e.g., multiplicity) of actuatable power semiconductor switches, and the DC voltage side of which is connected to a capacitive energy storage circuit. The capacitive energy storage circuit has at least one capacitive energy store and at least one snubber network for limiting the rate of current or voltage rise on the actuatable power semiconductor switches of the converter unit. According to an exemplary embodiment of the disclosure, the capacitive energy storage circuit has at least one passive nonactuatable damping unit having a unidirectional current-flow direction, wherein the passive nonactuatable damping unit has a diode and a damping resistor. Furthermore, the snubber network has a resistor, an inductance, a capacitance and a diode, wherein the resistor of the snubber network and the diode of the snubber network are connected in series, the series circuit including the resistor of the snubber network and the diode of the snubber network is connected in parallel with the inductance of the snubber network, and the capacitance of the snubber network is connected to the connecting point between the resistor of the snubber network and the diode of the snubber network. Overall, there is thus a separate diode provided for the passive nonactuatable damping unit and also a separate diode provided for the snubber network.

If an overcurrent now occurs in the capacitive energy storage circuit, said overcurrent normally having undesirable oscillations, then these oscillations in the overcurrent are damped by the passive nonactuatable damping unit, and the oscillations in the overcurrent are therefore successfully reduced. Furthermore, the passive nonactuatable damping unit is of extremely simple design as a result of the diode and the damping resistor, it is therefore very robust and inexpensive, and can accordingly be very easily implemented and, for example, retrofitted into an existing converter circuit.

The reference symbols used in the drawing and the meaning of said reference symbols are listed in summarized form in the list of reference symbols. In principle, identical parts are provided with the same reference symbols in the figures. The exemplary embodiments described are examples of the subject matter of the disclosure and have no limiting effect.

Figure 3:
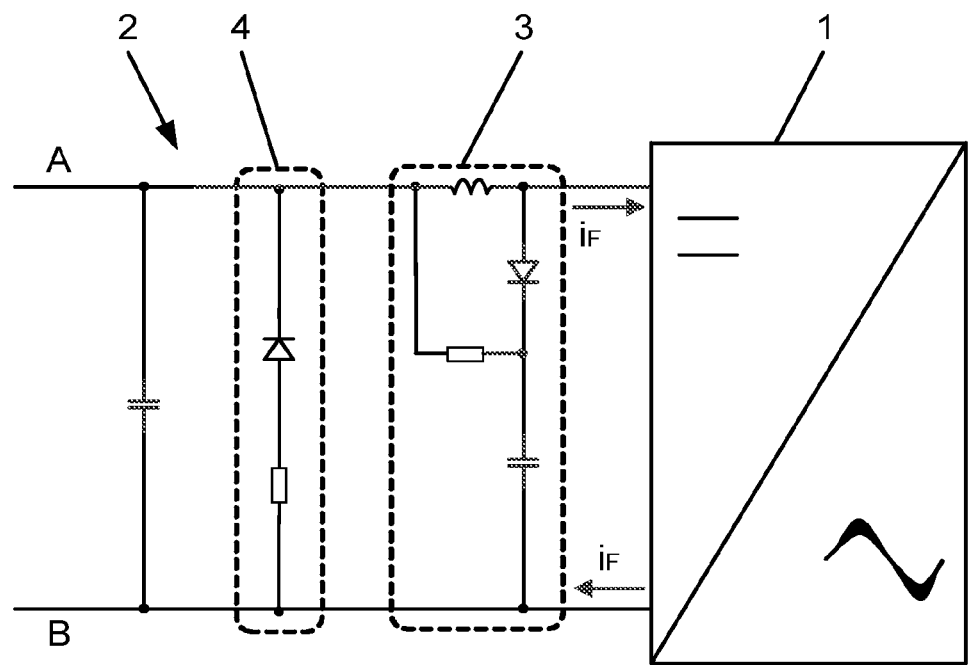
FIG. 3 shows a first converter circuit according to an exemplary embodiment of the present disclosure.

FIG. 3 shows a first converter circuit according to an exemplary embodiment of the present disclosure. As shown in FIG. 3, the converter circuit includes a converter unit 1, having a multiplicity of actuatable power semiconductor switches. By way of example, such an actuatable power semiconductor switch can then be in the form of a gate turn-off thyristor (GTO), in the form of an integrated gate commutated thyristor (IGCT), in the form of a power MOSFET or in the form of an insulated gate bipolar transistor (IGBT). The DC voltage side of the converter unit 1 is connected to a capacitive energy storage circuit 2, with the capacitive energy storage circuit 2 having at least one capacitive energy store and at least one snubber network 3 for limiting the rate of current or voltage rise on the actuatable power semiconductor switches of the converter unit 1. FIG. 3 shows a single capacitive energy store and a single snubber network 3. According to an exemplary embodiment of the present disclosure, the capacity energy storage circuit 2 can have at least one passive nonactuatable damping unit 4 having a unidirectional current-flow direction, wherein the passive nonactuatable damping unit 4 has a diode and a damping resistor. In the first exemplary embodiment shown in FIG. 3, a single passive nonactuatable damping unit 4 is provided. Furthermore, the snubber network 3, can have a resistor, an inductance, a capacitance and a diode, wherein the resistor of the snubber network 3 and the diode of the snubber network 3 are connected in series, the series circuit including the resistor of the snubber network 3 and the diode of the snubber network 3 connected in parallel with the inductance of the snubber network 3, and the capacitance of the snubber network 3 connected to the connecting point between the resistor of the snubber network 3 and the diode of the snubber network 3. Overall, a separate diode is thus provided for the passive nonactuatable damping unit 4 and also a separate diode is provided for the snubber network 3.

Figure 7:
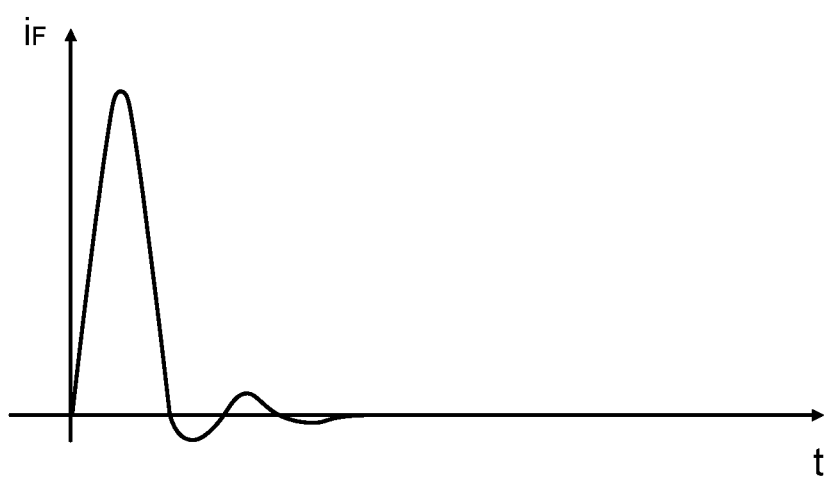
FIG. 7 shows a waveform for an overcurrent in the capacitive energy storage circuit of the converter circuit shown in FIG. 3 an exemplary embodiment of the present disclosure.

In the event of an overcurrent $i_F$ occurring in the capacitive energy storage circuit 2, oscillations in the overcurrent $i_F$, as can occur in known converter circuits, can be successfully damped by the passive nonactuatable damping unit 4, and the oscillations in the overcurrent $i_F$ can be therefore reduced. The oscillations can be reduced because the diode of the passive nonactuatable damping unit 4 means that the oscillating overcurrent $i_F$ advantageously has, for example, a current path via the damping resistor, which then damps the oscillations in the overcurrent $i_F$ in a desired manner. FIG. 7 shows a waveform for an overcurrent in the capacitive energy storage circuit of the converter circuit shown in FIG. 3 an exemplary embodiment of the present disclosure. FIG. 7 shows the aforementioned damping of the overcurrent $i_F$ by way of example using a waveform for the overcurrent $i_F$ of the converter circuit shown in FIG. 3. In addition, the passive nonactuatable damping unit 4 is of a simple design as result of the diode and the damping resistor, and is therefore very robust and inexpensive, and can easily be implemented. In addition, the passive nonactuatable damping unit 4 can be suitable for retrofitting into existing converter circuits.

The damping resistor can be a discrete component, or else can also be formed by the use of resistive material in the supply line to the resistor.

The diode of the passive nonactuatable damping unit 4 can be connected in series with the damping resistor of the passive nonactuatable damping unit 4, as shown by way of example in the first exemplary embodiment shown in FIG. 3.

In the case of a capacitive energy storage circuit 2 having a first and a second voltage potential A, B, as shown by way of example in FIG. 3, the snubber network 3 is connected to the first and second voltage potentials A, B of the capacitive energy storage circuit 2. By way of example, the first voltage potential A chosen is a positive voltage potential, and the second voltage potential B chosen is then a negative voltage potential of the same value. The passive nonactuatable damping unit 4 is then connected, as shown by way of example in FIG. 3, to the first and second voltage potentials A, B of the capacitive energy storage circuit 2. The interconnection of the individual components of the snubber network 3 which is cited above has already been described above. The snubber network 3 is inserted between the first and second voltage potentials A, B in the manner shown in FIG. 3, for example.

Figure 4:
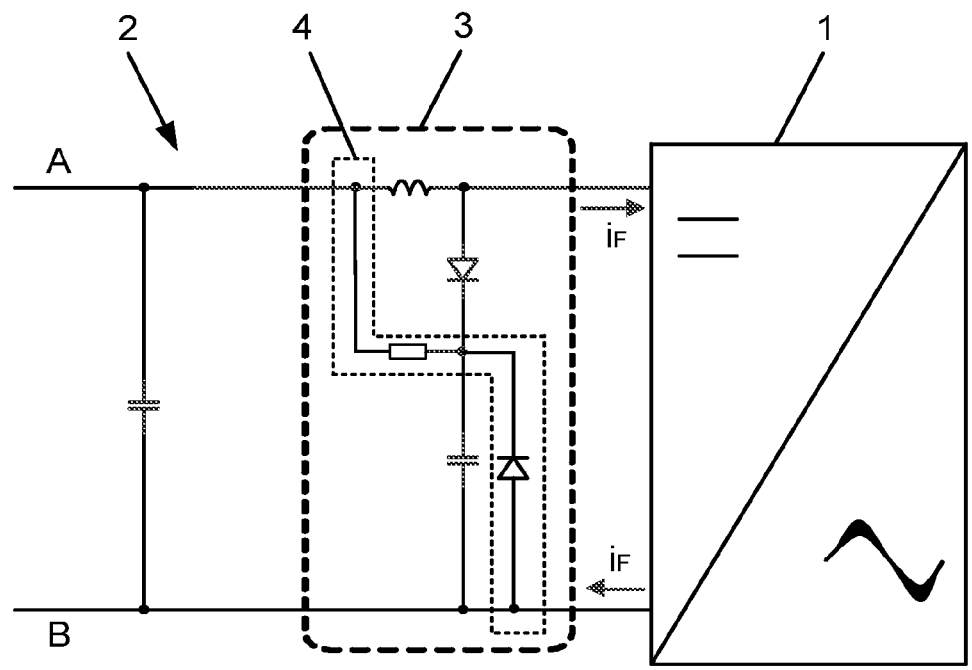
FIG. 4 shows a second converter circuit according to an exemplary embodiment of the present disclosure.

FIG. 4 shows a second converter circuit according to an exemplary embodiment of the present disclosure. As shown in FIG. 4, the damping resistor of the passive nonactuatable damping unit 4 is the resistor of the snubber network 3. This measure advantageously allows the already present resistor of the snubber network 3 to be used as a damping resistor, which means that an additional discrete damping resistor can be dispensed with and hence component costs, space and mounting complexity can be reduced. The snubber network 3 shown in FIG. 4 likewise has a resistor, an inductance, a capacitance and a diode. The individual aforementioned components of the snubber network 3 can be interconnected between the first and second voltage potentials A, B in the manner shown in FIG. 4, for example. For the exemplary embodiment shown in FIG. 4, the diode of the passive nonactuatable damping unit 4 can allow the oscillating overcurrent $i_F$ to have a current path via the damping resistor, which then damps the oscillations in the overcurrent $i_F$ in a desired manner.

Figure 5:
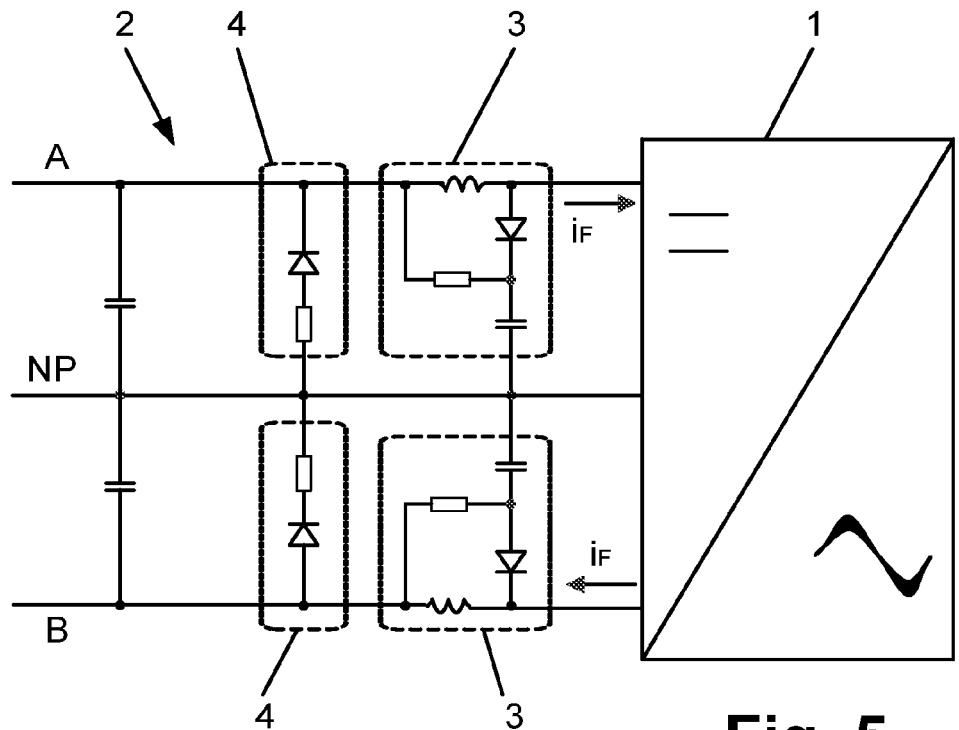
FIG. 5 shows a third converter circuit according to an exemplary embodiment of the present disclosure.

In the case of a capacitive energy storage circuit 2 having a first and a second voltage potential A, B, as already described above, and having an additional voltage zero potential NP, two snubber networks 3 and two passive nonactuatable damping units 4 can be provided. In terms of value, the voltage zero potential NP can be situated precisely between the first and second voltage potentials A, B and hence then has a potential with a value of 0V, for example in the case of a positive first voltage potential A and a negative second voltage potential B of the same value. FIG. 5 shows a third converter circuit according to an exemplary embodiment of the present disclosure. As shown in FIG. 5, the capacitive energy storage circuit 2 is designed to a have a first and a second voltage potential A, B and an additional voltage zero potential NP. As FIG. 5 shows, one of the snubber networks 3 is connected to the first voltage potential A of the capacitive energy storage circuit 2 and to the zero voltage potential NP of the capacitive energy storage circuit 2, and the other of the snubber networks 3 is connected to the second voltage potential B of the capacitive energy storage circuit 2 and to the zero voltage potential NP of the energy storage circuit 2. In addition, one of the passive nonactuatable damping units 4 is connected to the first voltage potential A of the capacitive energy storage circuit 2 and to the zero voltage potential NP of the capacitive energy storage circuit 2, and the other of the passive nonactuatable damping units 4 is connected to the second voltage potential B of the capacitive energy storage circuit 2 and to the zero voltage potential NP of the capacitive energy storage circuit 2. In any exemplary embodiment disclosed herein, the diode of the respective passive nonactuatable damping unit 4 is connected in series with the damping resistor of the associated passive nonactuatable damping unit 4. Further, the diode of the respective passive nonactuatable damping unit 4 allows the oscillating overcurrent iF to have a current path via the respective damping resistor, which then damps the oscillations in the overcurrent iF in a desired manner. The individual snubber networks 3 can be inserted between the first and second voltage potentials A, B and the voltage zero potential NP.

Figure 6:
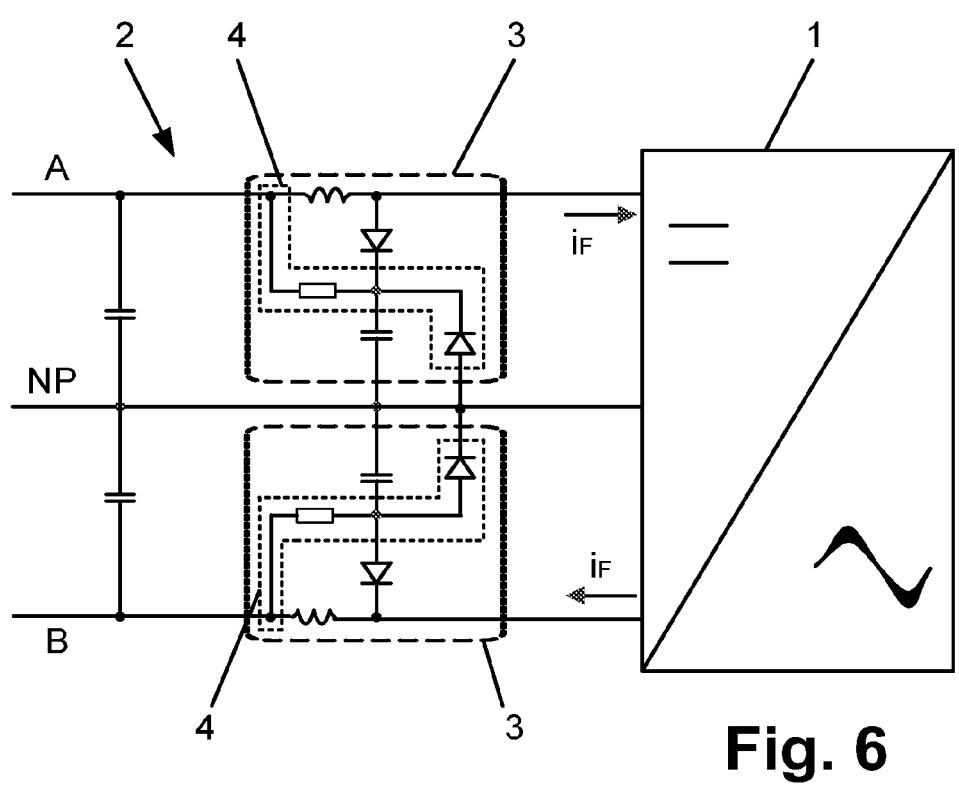
FIG. 6 shows a fourth converter circuit according to an exemplary embodiment of the present disclosure.

FIG. 6 shows a fourth converter circuit according to an exemplary embodiment of the present disclosure As shown in FIG. 6, the damping resistor of a respective one of the passive nonactuatable damping units 4 is the resistor of a respective one of the snubber networks 3. This measure advantageously allows the resistor of the respective snubber network 3 to be used as a damping resistor, which means that an additional discrete damping resistor can be dispensed with and hence component costs, space and mounting complexity can be reduced. For the exemplary embodiment shown in FIG. 6, the diode of the respective passive nonactuatable damping unit 4 allows the oscillating overcurrent iF to have a current path via the respective damping resistor, which then damps the oscillations in the overcurrent iF in a desired manner. In the exemplary embodiment shown in FIG. 6, the respective snubber network 3 likewise has a resistor, an inductance, a capacitance and a diode, wherein the individual aforementioned components of the respective snubber network 3 are interconnected between the first and second voltage potentials A, B and the voltage zero potential NP in the manner shown in FIG. 6, for example.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter unit
2 Capacitive energy storage circuit
3 Snubber network
4 Passive nonactuatable damping unit
A First voltage potential
B Second voltage potential
NP Voltage zero potential

What is claimed is:

1. A converter circuit comprising:
a converter unit, having a plurality of actuatable power semiconductor switches, and a DC voltage side connected to a capacitive energy storage circuit, wherein the capacitive energy storage circuit has at least one capacitive energy store and at least one snubber network for limiting a rate of current or voltage rise on the actuatable power semiconductor switches of the converter unit,
the capacitive energy storage circuit including at least one passive nonactuatable damping unit having a unidirectional current-flow direction, wherein the passive nonactuatable damping unit has a diode and a damping resistor; and
the snubber network including a resistor, an inductance, a capacitance and a diode, wherein the resistor of the snubber network and the diode of the snubber network are connected in series, the series circuit having the resistor of the snubber network and the diode of the snubber network connected in parallel with the inductance of the snubber network, and the capacitance of the snubber network is connected to a connecting point between the resistor of the snubber network and the diode of the snubber network,
wherein if the capacitive energy storage circuit has a first and a second voltage potential, the snubber network is connected to first and second voltage potentials of the capacitive energy storage circuit, and the at least one passive nonactuatable damping unit is connected to the first and second voltage potentials of the capacitive energy storage circuit.

2. The converter circuit as claimed in claim 1, wherein the diode of the at least one passive nonactuatable damping unit is connected in series with the damping resistor of the passive nonactuatable damping unit.

3. The converter circuit as claimed claim 2, wherein the damping resistor of the passive nonactuatable damping unit is the resistor of the snubber network.

4. The converter circuit as claimed claim 1, wherein the damping resistor of the passive nonactuatable damping unit is the resistor of the snubber network.

5. The converter circuit as claimed claim 1, wherein the damping resistor of the passive nonactuatable damping unit is the resistor of the snubber network.

6. The converter circuit as claimed in claim 1, wherein if the capacitive energy storage circuit has a first and a second voltage potential and a voltage zero potential, two snubber networks and two passive nonactuatable damping units are provided, one of the two snubber networks is connected to the first voltage potential of the capacitive energy storage circuit and to the zero voltage potential of the capacitive energy storage circuit, and another of the two snubber networks is connected to the second voltage potential of the capacitive energy storage circuit and to the zero voltage potential of the capacitive energy storage circuit, wherein one of the two passive nonactuatable damping units is connected to the first voltage potential of the capacitive energy storage circuit and to the zero voltage potential of the capacitive energy storage circuit, and another of the passive nonactuatable damping units is connected to the second voltage potential of the capacitive energy storage circuit and to the zero voltage potential of the capacitive energy storage circuit.

7. The converter circuit as claimed in claim 6, wherein the damping resistor of a respective one of the two passive nonactuatable damping units is the resistor of a respective one of the snubber networks.

8. A converter circuit comprising:
a converter unit, having a plurality of actuatable power semiconductor switches, and a DC voltage side connected to a capacitive energy storage circuit, wherein the capacitive energy storage circuit has at least one capacitive energy store and at least one snubber network for limiting a rate of current or voltage rise on the actuatable power semiconductor switches of the converter unit,
the snubber network including a resistor, an inductance, a capacitance and a diode, wherein the resistor of the snubber network and the diode of the snubber network are connected in series, the series circuit having the resistor of the snubber network and the diode of the snubber network connected in parallel with the inductance of the snubber network, and the capacitance of the snubber network is connected to a connecting point between the resistor of the snubber network and the diode of the snubber network,
wherein if the capacitive energy storage circuit has a first and a second voltage potential, the snubber network is connected to first and second voltage potentials of the capacitive energy storage circuit, and the at least one passive nonactuatable damping unit is connected to the first and second voltage potentials of the capacitive energy storage circuit.

9. The circuit as claimed in claim 8, wherein the capacitive energy storage circuit includes at least one passive nonactuatable damping unit having a unidirectional current-flow direction, wherein the passive nonactuatable damping unit has a diode and a damping resistor.

10. The converter circuit as claimed in claim 9, wherein the diode of the at least one passive nonactuatable damping unit is connected in series with the damping resistor of the passive nonactuatable damping unit.

11. The converter circuit as claimed claim 9, wherein the damping resistor of the passive nonactuatable damping unit is the resistor of the snubber network.

12. The converter circuit as claimed in claim 9, wherein if the capacitive energy storage circuit has a first and a second voltage potential and a voltage zero potential, two snubber networks and two passive nonactuatable damping units are provided, one of the two snubber networks is connected to the first voltage potential of the capacitive energy storage circuit and to the zero voltage potential of the capacitive energy storage circuit, and another of the two snubber networks is connected to the second voltage potential of the capacitive energy storage circuit and to the zero voltage potential of the capacitive energy storage circuit,
wherein one of the two passive nonactuatable damping units is connected to the first voltage potential of the capacitive energy storage circuit and to the zero voltage potential of the capacitive energy storage circuit, and another of the passive nonactuatable damping units is connected to the second voltage potential of the capacitive energy storage circuit and to the zero voltage potential of the capacitive energy storage circuit.

13. The converter circuit as claimed in claim 12, wherein the damping resistor of a respective one of the two passive nonactuatable damping units is the resistor of a respective one of the snubber networks.

* * * * *